US012206582B2

(12) United States Patent
Mohan et al.

(10) Patent No.: US 12,206,582 B2
(45) Date of Patent: Jan. 21, 2025

(54) FACILITATING FAST RE-ROUTE IN HIGH-AVAILABILITY NETWORKS

(71) Applicant: Hewlett Packard Enterprise Development LP, Houston, TX (US)

(72) Inventors: Saurabh Mohan, Sunnyvale, CA (US); Nisarg Rajesh Shah, Folsom, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/976,732

(22) Filed: Oct. 28, 2022

(65) Prior Publication Data
US 2024/0146653 A1 May 2, 2024

(51) Int. Cl.
*H04L 45/748* (2022.01)
*H04L 45/00* (2022.01)
*H04L 45/18* (2022.01)

(52) U.S. Cl.
CPC ............ *H04L 45/748* (2013.01); *H04L 45/18* (2013.01); *H04L 45/20* (2013.01)

(58) Field of Classification Search
CPC ....... H04L 45/748; H04L 45/18; H04L 45/20; H04L 45/02
See application file for complete search history.

(56) References Cited

U.S. PATENT DOCUMENTS

| 8,077,726 | B1* | 12/2011 | Kumar | .................. | H04W 88/16 370/395.31 |
| 9,832,121 | B1* | 11/2017 | Singh | .................... | H04L 45/745 |
| 11,546,078 | B1* | 1/2023 | Lim | .................... | H04B 10/0795 |
| 2014/0269261 | A1* | 9/2014 | D'Souza | .................. | H04L 45/28 370/225 |
| 2015/0146536 | A1* | 5/2015 | Minei | .................... | H04L 45/507 370/236 |
| 2017/0093691 | A1* | 3/2017 | Garcia-Luna-Aceves | .................... | H04L 45/38 |
| 2018/0351862 | A1* | 12/2018 | Jeganathan | ........... | H04L 45/586 |

(Continued)

FOREIGN PATENT DOCUMENTS

CN 111917637 B * 5/2022 ............. H04L 45/02

OTHER PUBLICATIONS

Atlas et al., "Basic Specification for IP Fast Reroute: Loop-Free Alternates", Request for Comments: 5286, Sep. 2008, 31 pages.

*Primary Examiner* — Thu V Nguyen
*Assistant Examiner* — Ranjan Pant
(74) *Attorney, Agent, or Firm* — Yao Legal Services, Inc.

(57) ABSTRACT

A system for efficiently determining a set of next-hop switches from a switch is provided. During operation, the system can determine the plurality of next-hop switches for an Internet Protocol (IP) address prefix. The system can then store, in an entry of a forwarding data structure of the switch, a list of identifying information indicating the plurality of next-hop switches corresponding to the IP address prefix. The identifying information for the plurality of next-hop switches can be stored in the list in an order of preference for forwarding traffic matching the IP address prefix. Upon receiving a packet with a destination IP address matching the IP address prefix, the system can select the entry from the forwarding data structure for determining a next-hop switch for forwarding the packet. The system can then determine the next-hop switch for the packet from the entry based on the order of preference.

20 Claims, 8 Drawing Sheets

(56) References Cited

U.S. PATENT DOCUMENTS

| | | | | |
|---|---|---|---|---|
| 2018/0351863 A1* | 12/2018 | Vairavakkalai | ......... | H04L 45/50 |
| 2019/0280969 A1* | 9/2019 | Liu | ......... | H04L 45/48 |
| 2019/0294549 A1* | 9/2019 | Levy | ......... | H04L 45/742 |
| 2021/0021517 A1* | 1/2021 | Sellappa | ......... | H04L 45/745 |
| 2021/0119907 A1* | 4/2021 | Hu | ......... | H04L 45/28 |
| 2022/0070084 A1* | 3/2022 | Parakala | ......... | H04L 45/12 |

* cited by examiner

FACILITATING FAST RE-ROUTE IN HIGH-AVAILABILITY NETWORKS

BACKGROUND

Field

The Present Disclosure Relates to Communication Networks. More specifically, the present disclosure relates to a method and system for facilitating efficient next-hop switch selection from a forwarding data structure while facilitating high-availability among routes.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, equipment vendors race to build switches with versatile capabilities, such as an enhanced routing process that can determine loop-free alternate routes (e.g., multiple routes) for a network prefix. The routing process can then determine a plurality of next-hop switches for a respective routing prefix. Such routes can facilitate local protection for unicast traffic in a layer-3 network (e.g., an Internet Protocol (IP) network) by using an alternate route after a topology change due to a failure.

The routing process (e.g., a Border Gateway Protocol (BGP) instance) can receive route or link updates from neighboring networks. Such updates can correspond to a network prefix, such as an IP prefix. Based on the updates, the routing process can determine an efficient route (or path) to a respective prefix. Accordingly, the switch can populate a routing data structure (RDS) (e.g., a routing information base (RIB)) with the routes determined by the routing process. A route associated with a prefix can represent what the next-hop switch should be for that prefix. Based on the information in the RDS, the switch can store the identifier of the next-hop switch in association with the prefix in a forwarding data structure (FDS) (e.g., forwarding information base (FIB)). Since the FDS is populated based on the routing process, determining the next-hop switches from multiple alternate routes for a respective network prefix may require extensive computation.

The aspects described herein solve the problem of efficiently providing a set of next-hop switches for a network prefix in an FDS by (i) determining alternate routes from a switch based on topology information; (ii) determining a set of next-hop switches for the prefix based on the alternate routes, and (iii) storing respective identifies of the set of next-hop switches in association with the prefix in the FDS of the switch. The topology information can indicate how the switch is coupled to different provider networks. Instead of the routing process of the switch computing routes for a large number of prefixes, the switch can track the next-hop switches of different provider networks (e.g., the gateway switches) and use them for the prefixes.

Often an edge switch may be coupled with multiple provider networks (e.g., Internet Service Provider (ISP) networks). Each of the provider network may support a large number of network prefixes (e.g., IP prefixes). With existing technologies, if the switch participates in the routing process (e.g., a BGP instance) of each of the provider networks, the routing process on the switch may need to calculate a large number of routes for the IP prefixes. For example, one provider network may provide an efficient route (or path) for one prefix while another provider network may provide an efficient route for another prefix. As a result, if the switch determines alternate routes, the switch may need to determine alternate routes through all provider networks for a respective prefix. Hence, the routing process at the switch can become inefficient.

Furthermore, the alternate next-hop switches for a prefix can be stored in the RDS of the switch. One of the next-hop switches can be the "selected next-hop switch," which can be the preferred next hop for the prefix. The routing process can use a metric indicating the least-cost path to determine the selected next-hop switch. The metric can be based on one or more of: number of hops, delay, link capacity, residual capacity, security, and preference. Typically, the routing process may determine the next-hop switch indicated in the selected route and store the identifier of the determined next-hop switch for the prefix in the FDS. As a result, even though multiple routes are calculated by the routing process, the FDS may maintain the identifier of the next-hop switch for the selected route.

To solve this problem, the FDS of the switch can maintain an adjacency list generated from the topology information associated with the switch based on next-hop tracking (NHT). Hence, the set of next-hop switches in the adjacency list can be referred to as an NHTS. The adjacency list can be an ordered list of next-hop switches based on the corresponding forwarding preferences. If the switch is an edge switch, the switch can be coupled to a plurality of provider networks. The preferences can then be based on the provider networks where one provider network can be preferable compared to the other networks. The preferences can also be based on corresponding path costs.

Since the switch can be an edge switch, a respective next-hop switch from the switch can belong to a provider network. Because the switch can be an edge switch of a different autonomous system (AS), a provider network would not establish a route through the switch to another provider network. In other words, the provider network may not select the switch as a transit router for a prefix. Hence, the next-hop switches can provide loop-free alternative routes from the switch. The switch can then determine that the next-hop switches provide alternate routes from the network topology information because the next-hop switches belong to different provider networks. Accordingly, the switch can deploy an NHT system that can track a respective next-hop switch belonging to different provider networks. The NHT system can obtain the topology information associated with the switch and identify the next-hop switches of different provider networks.

The NHT system can obtain the topology information based on one or more of: a topology discovery protocol, tracking the route advertisements from different provider networks based on their different identifiers (e.g., AS numbers), notifications from a management or provisioning platform, and manual entries. By tracking the next-hop switches, the NHT system can discover the respective loop-free alternate routes through the next-hop switches. The NHT system can then generate an entry for the prefix in the FDS with an adjacency list that includes the identifiers of the next-hop switches in an order of forwarding preference. Once the NHT system can track the next-hop switches for a prefix, the NHT system can generate the adjacency list instead of the routing process determining loop-free alternate routes for the prefix. In this way, the NHT system can efficiently facilitate a set of next-hop switches for a respective prefix.

Alternatively, the switch can also obtain the next-hop routes based on the routing process of the switch. The routing process can determine loop-free alternates for fast reroutes (e.g., based on Request for Comments (RFC) 5286). For example, the routing process can receive route advertisements from the provider networks for the prefixes reachable via the provider networks. Based on the route advertisements, the routing process can determine loop-free alternate routes for a respective prefix. Each of the alternate routes for a prefix can indicate a corresponding next-hop switch. The routing process can store the next-hop switches in association with the prefix in the RDS. Based on the entries in the RDS, the switch can store and propagate the information to the FDS. The NHT system can generate an entry for the prefix in the FDS with the adjacency list using the information from the RDS. Since the routing process can determine multiple loop-free paths, the NHT system can generate the adjacency list with low computational overhead.

Upon receiving a packet, the switch can look up the destination address (e.g., an IP address) of the packet in the FDS. If the destination address matches a prefix based on the longest prefix match, the switch can determine the corresponding adjacency list. Based on the ordering of next-hop switches (e.g., the initial one) in the adjacency list, the switch can select a next-hop switch for forwarding. If the primary route becomes unavailable, the NHT system can determine the unavailability from the routing process and the RDS. The switch can then select the subsequent next-hop switch from the adjacency list and may remove the next-hop switch associated with the unavailability from the adjacency list. In this way, the adjacency list in the FDS can facilitate fast convergence for the unavailability with low computational overhead.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1:
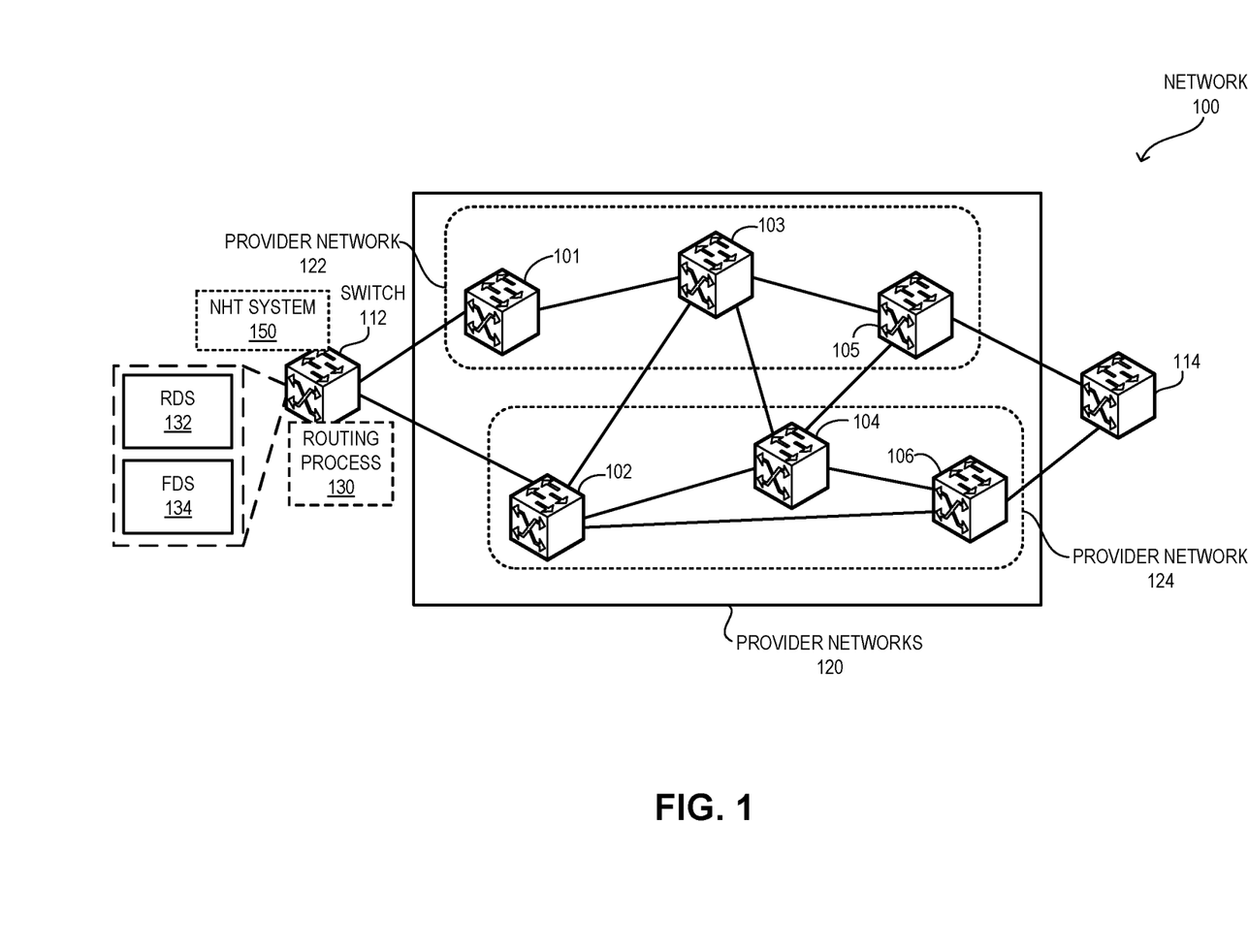
FIG. 1 illustrates an example of a network facilitating a set of next-hop switches associated with corresponding alternate routes for a network prefix, in accordance with an aspect of the present application.

FIG. 1 illustrates an example of a network facilitating a set of next-hop switches associated with corresponding alternate routes for a network prefix, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. In network 100, edge switches 112 and 114 can be coupled to a set of provider networks 120 (e.g., ISP networks). Provider networks 120 can include switches 101, 102, 103, 104, 105, and 106. A respective switch of network 100 can deploy an instance of a relational database and can be associated with a media access control (MAC) address and an IP address.

A respective link in network 100 can be a physical link or a tunnel spanning one or more physical links. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). For example, switches 112 and 114 can be customer edge (CE)

switches of an MPLS network while the switches in provider networks 120 can be provider edge (PE) switches. A respective switch pair in network 100 can be a BGP peer and advertise routing information based on their respective BGP. Here, provider networks 120 can include a provider network 122 that can include switches 101, 103, and 105, and another provider network 124 that can include switches 102, 104, and 106. A respective provider network can be within a corresponding administrative domain (e.g., a hierarchical AS).

Each of provider networks 120 may support a large number of network prefixes (e.g., IP prefixes). With existing technologies, if switch 112 participates in the routing process of each of the provider networks 120, routing process 130 on switch 112 may need to calculate a large number of routes for the IP prefixes. For example, provider network 122 may provide an efficient route (or path) for one prefix while provider network 124 may provide an efficient route for another prefix. As a result, if switch 112 determines alternate routes for a prefix, switch 112 may need to determine alternate routes through networks 122 and 124 for a respective prefix. Hence, routing process 130 can become inefficient due to extensive computation overhead on switch 112.

Furthermore, the alternate routes for a prefix can be stored in RDS 132 of switch 112. RDS 132 may indicate a routing table or an RIB of switch 112. One of the alternate routes can be the "selected route" in RDS 132. The selected route can be the preferred route for the prefix. Routing process 130 can use a metric indicating the least-cost path to determine the selected route. The metric can be based on one or more of: number of hops from switch 112, delay on links, link capacity, residual capacity, security, and preference configured in switch 112. Typically, routing process 130 may determine the next-hop switch indicated in the selected route and store the identifier of the determined next-hop switch for the prefix in FDS 134 in switch 112. FDS 134 may indicate a forwarding table or an FIB of switch 112. As a result, even though multiple routes are calculated by routing process 130, FDS 134 may maintain the identifier of the next-hop switch for the selected route.

To solve this problem, switch 112 can deploy an NHT system 150 that can maintain an adjacency list for a respective prefix determined by routing process 130. The adjacency list can include the respective identifiers of a set of next-hop routes, such as switches 101 and 102, in the order of forwarding preference of switch 112. A respective entry of FDS can then include the prefix and the corresponding adjacency list. Since switch 112 can be an edge switch, the forwarding preference can indicate whether to forward packets via prover network 122 or 124. The preferences can also be based on corresponding link or path costs. For example, NHT system 150 can obtain the respective path costs associated with the corresponding routes through switches 101 and 102, and determine the order for the adjacency list accordingly.

Because switch 112 can be an edge switch of a different AS, provider network 122 or 124 would not establish a route through switch 112 to the other provider network. In other words, provider network 122 or 124 may not select switch 124 as a transit router for a prefix. Hence, next-hop switches 101 and 102 can provide loop-free alternative routes from switch 112. NHT system 150 can then determine that next-hop switches 101 and 102 provide alternate routes from the topology information of network 100 because switches 101 and 102 belong to different provider networks 122 and 124, respectively. Accordingly, NHT system 150 can track next-hop switches 101 and 102. NHT system 150 can obtain the topology information associated with switch 112 and identify next-hop switches 101 and 102.

NHT system 150 can obtain the topology information based on one or more of: a topology discovery protocol, tracking the route advertisements from provider networks 122 and 124, notifications from a management or provisioning platform, and manual entries. By tracking next-hop switches 101 and 102, NHT system 150 can discover the respective loop-free alternate routes through next-hop switches 101 and 102. NHT system 150 can then generate an entry for the prefix in FDS 134 with an adjacency list that includes the identifiers of switches 101 and 102 in an order of forwarding preference. Once NHT system 150 can track the next-hop switches for a prefix, NHT system 150 can generate the adjacency list instead of routing process 130 determining loop-free alternate routes for the prefix. In this way, NHT system 150 can efficiently facilitate a set of next-hop switches for a respective prefix.

Switch 112 can also obtain the next-hop routes through provider networks 122 and 124 based on routing process 130. Routing process 130 can determine loop-free alternates for fast reroutes (e.g., based on RFC 5286) and store them in RDS 132. NHT system 150 can then obtain the next-hop information from RDS 132 for a respective prefix and generate the corresponding adjacency list for FDS 134 instead of only the next-hop switch. Since routing process 130 may determine the alternate paths for a respective prefix, NHT system 150 can generate the adjacency list for the prefix with low additional computational overhead. Switch 112 can forward a packet matching the prefix to the next-hop switch based on the order of the adjacency list. If the route through the next-hop switch becomes unavailable, switch 112 can readily select the subsequent next-hop switch from the adjacency list, thereby facilitating fast convergence with low computational overhead.

The total number of adjacency lists can correspond to a factorial of the number of next-hop switches. In the example in FIG. 1, there are two provider networks 122 and 124. Hence, the number of possible adjacency lists can be the factorial of two (e.g., 2!). Here, such adjacency lists can be {switch 101, switch 102} and {switch 102, switch 101}. Since the number of adjacency lists can be significantly smaller than the number of routes published through provider networks 122 and 124, determining next-hop switches based on next-hop tracking can be an efficient way of populating FDS 134.

Figure 2:
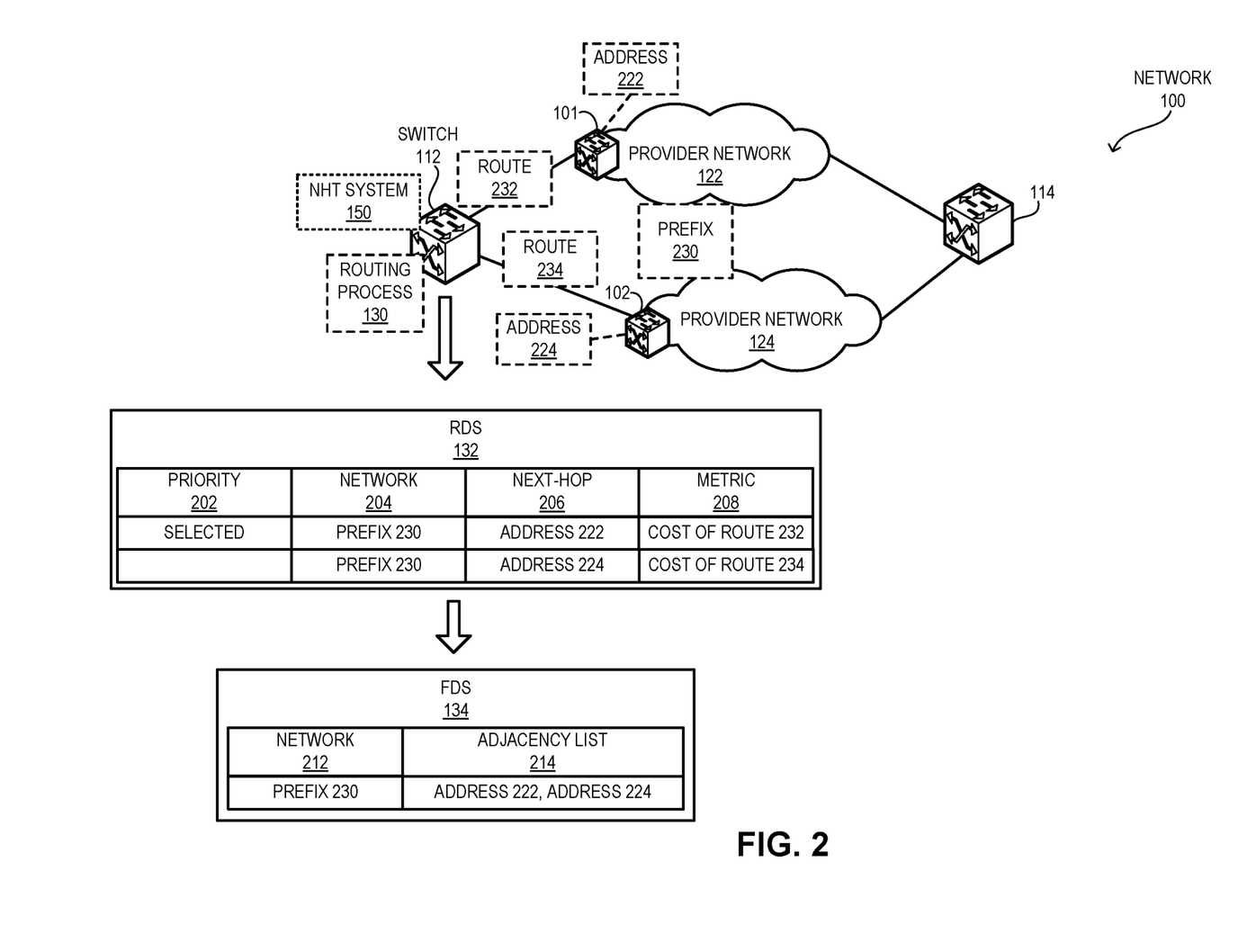
FIG. 2 illustrates an example of a forwarding data structure supporting a set of next-hop switches associated with corresponding alternate routes for a network prefix, in accordance with an aspect of the present application.

FIG. 2 illustrates an example of a forwarding data structure supporting a set of next-hop switches associated with corresponding alternate routes for a network prefix, in accordance with an aspect of the present application. Switch 112 can maintain routing entries in RDS 132 and corresponding forwarding entries in FDS 134. A respective entry of RDS 132 can include a priority 202, a network 204 (represented by a network prefix), and a next-hop switch 206 for network 204. Here, priority 202 can indicate whether the entry corresponds to a "selected route." The selected route can be the primary route for network 204. The entry may also include a metric 208, such as path cost, associated with the path that determines next-hop switch 206. The selected route can be selected based on metric 208. On other hand, a respective entry of FDS 134 can include a network 212, which corresponds to network 204 of RDS 132, and an adjacency list 214 for network 212.

During operation, NHT system 150 can obtain network addresses 222 and 224 of switches 101 and 102 respectively (e.g., using a link discovery protocol). A respective network address can include one or more of: a MAC address and an IP address. NHT system 150 can then track route information exchanges associated with addresses 222 and 224. Based on the route information, NHT system 150 can determine that a prefix 230 can be reachable via addresses 222 and 224. Accordingly, NHT system 150 can determine switches 101 and 102 as next-hop switches for prefix 230. NHT system 150 can then generate an entry for prefix 230 in FDS 134 with adjacency list that includes addresses 222 and 224 in an order of forwarding preference. For example, if provider network 122 is a preferred network for switch 112, address 222 can appear first in the adjacency list.

NHT system 150 can also populate adjacency list 214 using the entries of RDS 132. When network 100 converges, routing process 130 can receive route advertisements from provider networks 122 and 124 for prefix 230, which can be reachable via provider networks 122 and 124. Based on the route advertisements, routing process 130 can determine loop-free alternate routes 232 and 234 for prefix 230 via provider networks 122 and 124, respectively. Routing process 130 can then generate respective entries for prefix 230 corresponding to routes 232 and 234. The entry corresponding to route 232 can include prefix 230, address 222, and cost of route 232 as network 204, next-hop switch 206, and metric 208, respectively. On the other hand, the entry corresponding to route 234 can include prefix 230, address 224, and cost of route 234 as network 204, next-hop switch 206, and metric 208, respectively.

Based on the forwarding priority, such as metric 208, routing process 130 can determine which route is the preferred route. Suppose that route 232 via provider network 122 is the preferred route. Hence, priority 202 can indicate that the entry corresponding to route 232 is the "selected route." Accordingly, the destination address of a packet matching prefix 230 (e.g., based on longest-prefix match) can be forwarded to address 222 (i.e., switch 101). A typical FIB entry can include address 222 as the next-hop switch for prefix 230 based on the selected route. Unlike the FIB entry, the entry of FDS can include adjacency list 214 instead of the next-hop switch.

NHT system 150 can populate adjacency list 214 by including the next-hop switch from all entries for prefix 230 from RDS 132. Adjacency list 214 for prefix 230 can then include addresses 222 and 224. The ordering of adjacency list 214 can be based on corresponding values of metric 208. Since routing process 130 can determine multiple loop-free paths in routes 232 and 234, NHT system 150 can generate adjacency list 214 with low computational overhead. In this way, FDS 134 can facilitate packet forwarding via the selected route while facilitating efficient rerouting for prefix 230.

Figure 3:
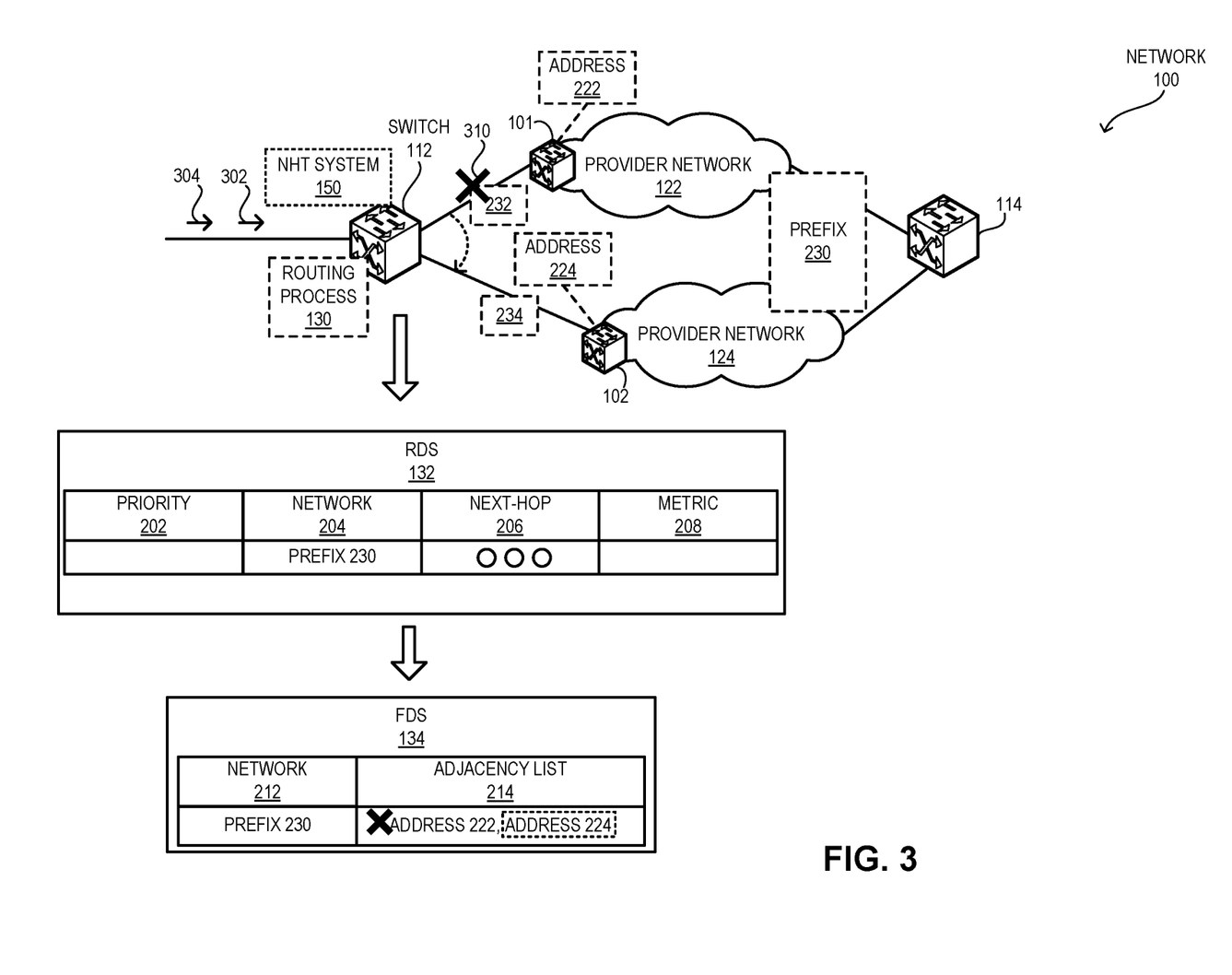
FIG. 3 illustrates an example of selecting a next-hop switch from a forwarding data structure during the unavailability of a primary route, in accordance with an aspect of the present application.

FIG. 3 illustrates an example of selecting a next-hop switch from a forwarding data structure during the unavailability of a primary route, in accordance with an aspect of the present application. Upon receiving a packet 302, switch 112 can look up the destination address (e.g., an IP address) of packet 302 in FDS 134. If the destination address matches prefix 230 based on the longest prefix match, switch 112 can determine the adjacency list with addresses 222 and 224. Based on the ordering of the adjacency list, switch 112 can select address 222 for forwarding packet 302. Switch 101 can then become selected as the next-hop switch for packet 302.

Suppose that an event 310 causes primary route 232 via provider network 122 to be unavailable. Event 310 can include one or more of: a link failure, a node failure, a power cycle of a switch, and software upgrade of a switch. Routing process 130 can discover the unavailability of route 232 (e.g., using Bidirectional Forwarding Detection (BFD)). Routing process 130 can then update the corresponding entries in RDS 132. NHT system 150 can then select the subsequent next-hop switch from the adjacency list. In this example, the subsequent next-hop switch, which is switch 102 of provider network 124, is represented by address 224 in the adjacency list (denoted with dotted lines). NHT system 150 may remove address 222 associated with the unavailability from the adjacency list.

When a packet 304 arrives at switch 112 after event 300, switch 112 can look up the destination address of packet 304 in FDS 134. If the destination address matches prefix 230 based on the longest prefix match, switch 112 can determine the adjacency list with address 224. Since the adjacency list now includes only one address, switch 112 can select address 224 for forwarding packet 304. Switch 102 can then become selected as the next-hop switch for packet 304. Since the subsequent next-hop switch can readily be selected from the adjacent list, even if packet 304 arrives shortly after event 300, switch 112 can forward packet 304 using FDS 134. In this way, the adjacency list in FDS 134 can facilitate fast convergence for the unavailability with low computational overhead.

Figure 4A:
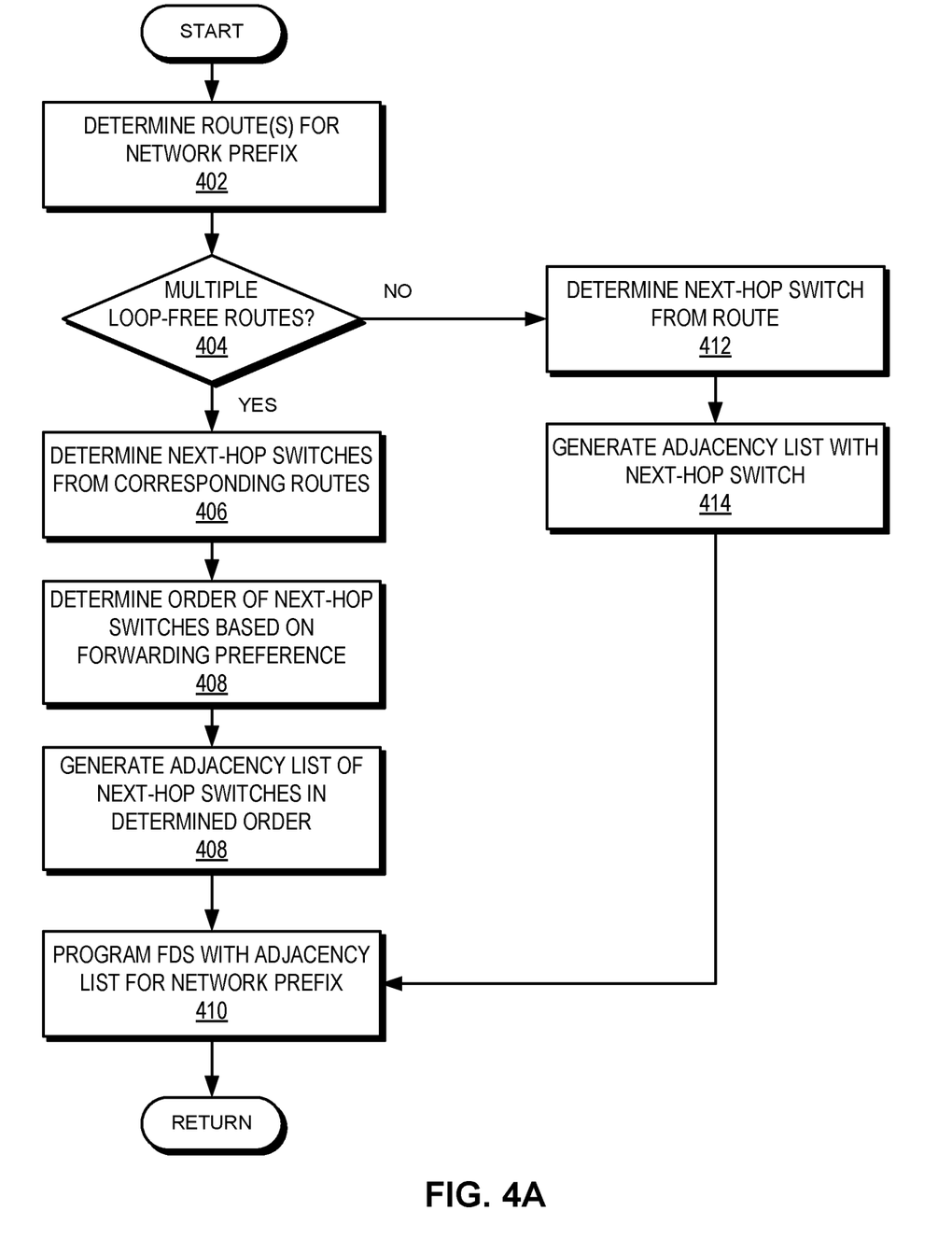
FIG. 4A presents a flowchart illustrating the process of a switch incorporating a set of next-hop switches associated with corresponding alternate routes into a forwarding data structure for a network prefix, in accordance with an aspect of the present application.

FIG. 4A presents a flowchart illustrating the process of a switch incorporating a set of next-hop switches associated with corresponding alternate routes into a forwarding data structure for a network prefix, in accordance with an aspect of the present application. During operation, the switch can determine route(s) for a network prefix (operation 402). The switch can then determine whether multiple loop-free routes are determined (operation 404). This determination can be based on the tracking of next-hop switches of different provider networks or from a routing process of the switch. If multiple loop-free routes are determined, the switch can determine the next-hop switches from the corresponding routes (operation 406).

The switch can also determine an order of next-hop switches based on a forwarding preference (operation 408). The switch can then generate an adjacency list of the next-hop switches in the determined order (operation 408). The adjacency list can include the respective addresses (e.g., IP addresses) of the next-hop switches in the determined order. On the other hand, if multiple loop-free routes are not determined, the switch can determine a next-hop switch from the since route (operation 412) and generate an adjacency list of the next-hop switch (operation 414). Here, the adjacency list may include a single identifier. Upon determining the adjacency list (operation 408 or 414), the switch can program the FDS with the adjacency list for the network prefix (operation 410).

Figure 4B:
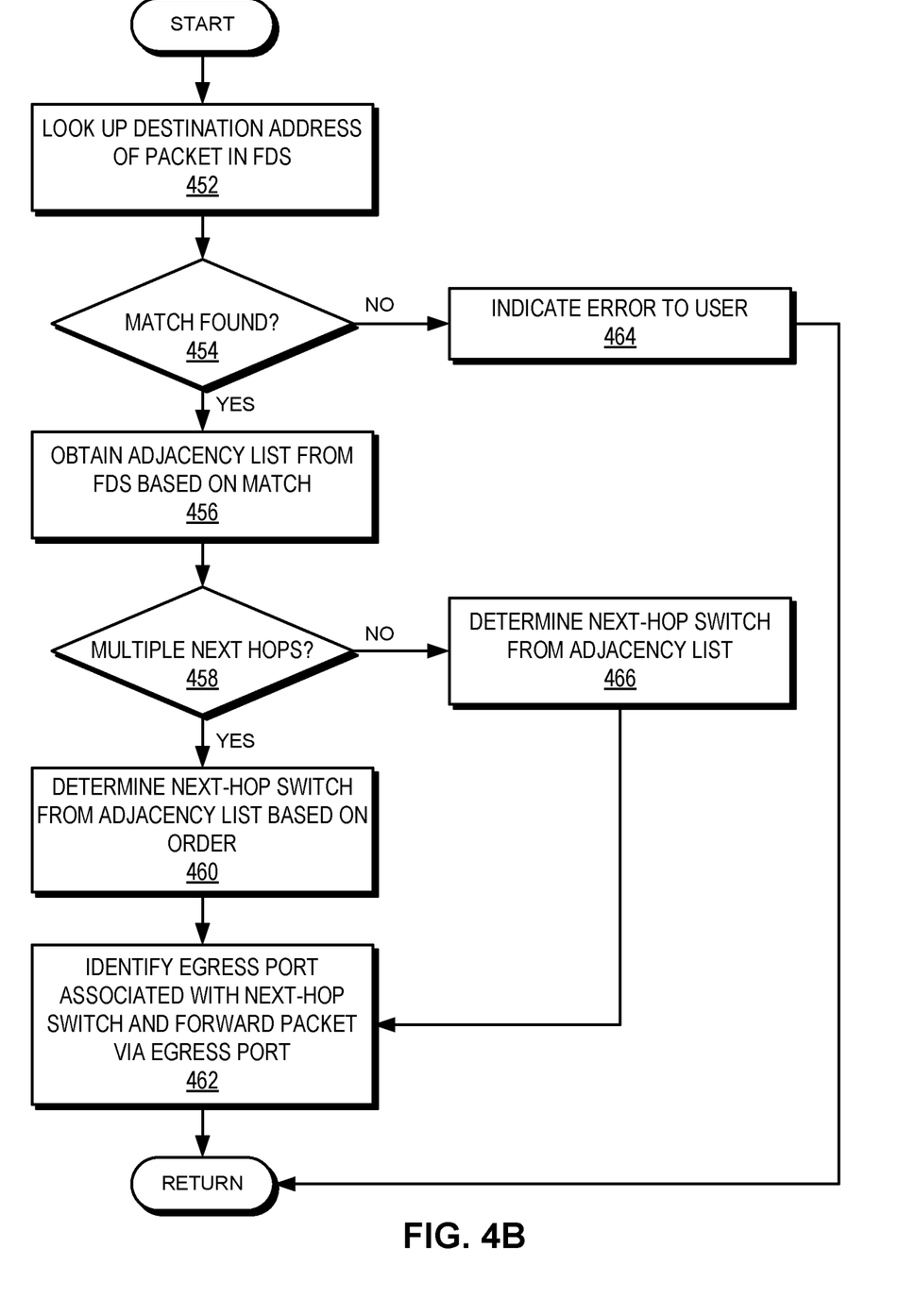
FIG. 4B presents a flowchart illustrating the process of a switch determining a next-hop switch from a set of next-hop switches for forwarding a packet, in accordance with an aspect of the present application.

FIG. 4B presents a flowchart illustrating the process of a switch determining a next-hop switch from a set of next-hop switches for forwarding a packet, in accordance with an aspect of the present application. Upon receiving the packet, the switch can loop up the destination address of the packet in the FDS (operation 452) and determine whether a match (e.g., based on the longest-prefix match) is found (operation 454). If a match is found, the switch can obtain the adjacency list from the FDS based on the match (operation 456) and determine whether multiple next-hop switches are present in the adjacency list (operation 458). If multiple next-hop switches are present, the switch can determine the next-hop switch from the adjacency list based on the order (operation 460).

On the other hand, if multiple next-hop switches are not present, the switch can determine the next-hop switch from the adjacency list (operation 466). Upon determining the next-hop switch (operation 460 or 466), the switch can identify the egress port associated with the next-hop switch (e.g., from an egress port mapped to a MAC address of the next-hop switch) and forward the packet via the egress port (operation 452). However, if a match is not found, the switch can indicate an error to a user (e.g., an administrator) (operation 464).

Figure 5A:
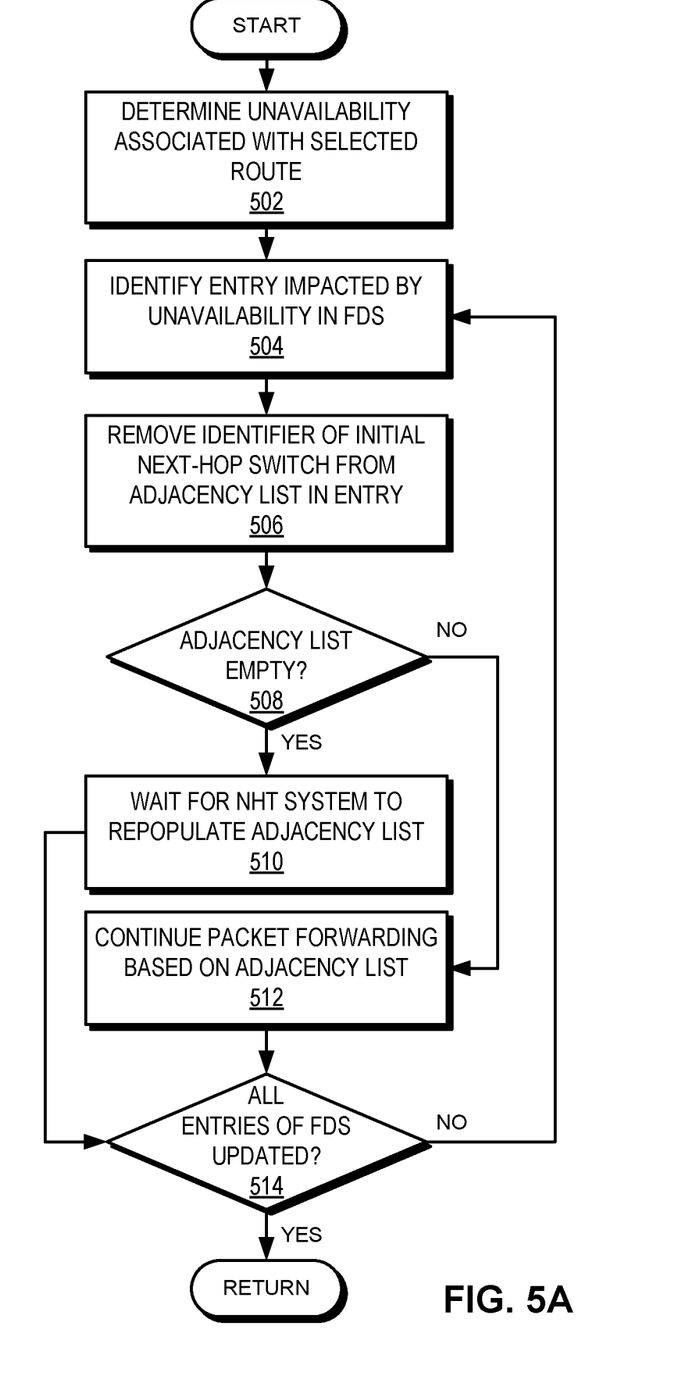
FIG. 5A presents a flowchart illustrating the process of a switch selecting a next-hop switch from a forwarding data structure during the unavailability of a primary route, in accordance with an aspect of the present application.

FIG. 5A presents a flowchart illustrating the process of a switch selecting a next-hop switch from a forwarding data structure during the unavailability of a primary route, in accordance with an aspect of the present application. During operation, the switch can determine the unavailability associated with the selected route (i.e., the primary route) (operation 502) and identify an entry impacted by the unavailability in the FDS (operation 504). The switch can then remove the identifier of the initial (or first) next-hop switch from the adjacency list in the entry (operation 506) and determine whether the adjacency list is empty (operation 508).

If the adjacency list is empty, the switch can wait for the NHT system to repopulate the adjacency list (operation 510). On the other hand, if the adjacency list is not empty, the switch can continue packet forwarding based on the adjacency list (operation 512). The switch can then determine whether all relevant entries of the FDS is updates (operation 514). If all relevant entries are not updated, the switch can continue to identify the next entry impacted by the unavailability in the FDS (operation 504).

Figure 5B:
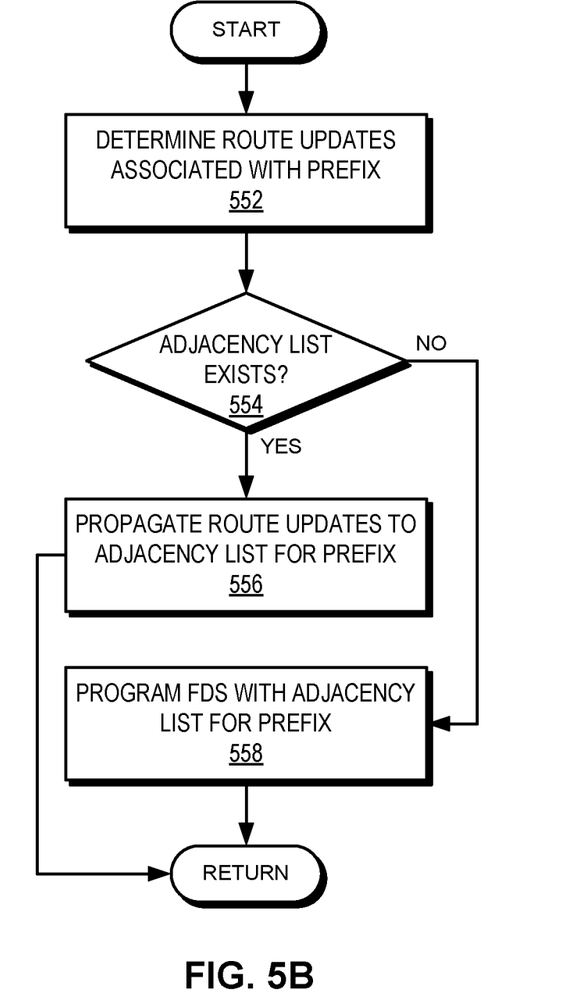
FIG. 5B presents a flowchart illustrating the process of a switch incorporating a route update associated with a network prefix into a corresponding a set of next-hop switches in a forwarding data structure, in accordance with an aspect of the present application.

FIG. 5B presents a flowchart illustrating the process of a switch incorporating a route update associated with a network prefix into a corresponding a set of next-hop switches in a forwarding data structure, in accordance with an aspect of the present application. During operation, the switch can determine route updates associated with a prefix (operation 552) and determine whether the adjacency list for the prefix exists (operation 554). If the prefix exists, the switch can propagate the route updates to the adjacency list for the prefix (operation 556). On the other hand, if the prefix does not exist, the switch can program the FDS with an adjacency list for the prefix, as described in conjunction with FIG. 4A (operation 556).

Figure 6:
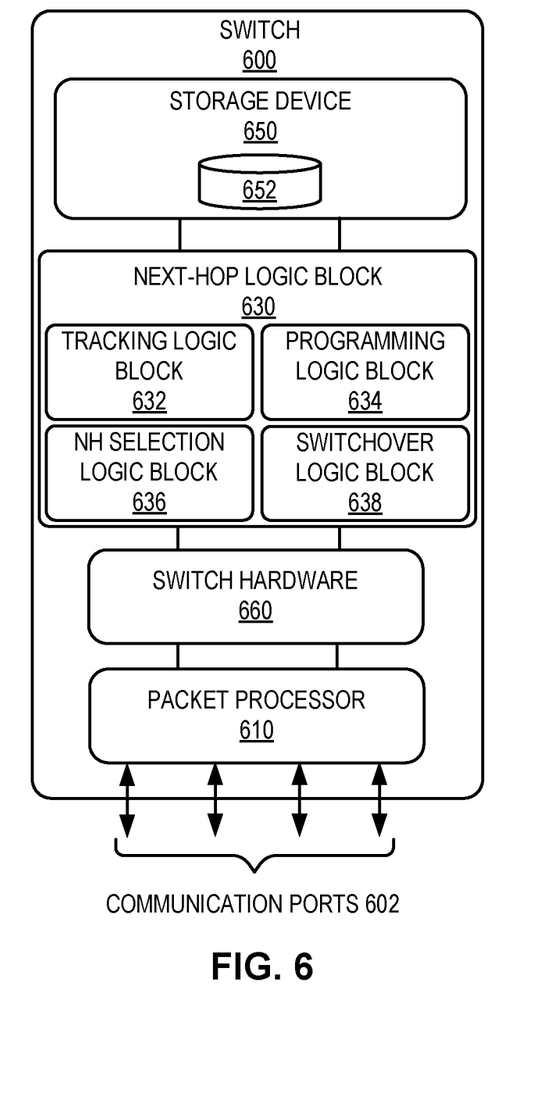
FIG. 6 illustrates an example of a switch supporting efficient determination of a set of next-hop switches associated with corresponding alternate routes for a network prefix, in accordance with an aspect of the present application.

FIG. 6 illustrates an example of a switch supporting efficient determination of a set of next-hop switches associated with corresponding alternate routes for a network prefix, in accordance with an aspect of the present application. In this example, a switch 600 can include a number of communication ports 602, a packet processor 610, and a storage device 650. Switch 600 can also include switch hardware 660 (e.g., processing hardware of switch 600, such as application-specific integrated circuit (ASIC) chips), which includes information based on which switch 600 processes packets (e.g., determines output ports for packets). In other words, switch hardware 660 includes switching circuitry for switch 600. Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Such information can include an RDS and an FDS of the switch 600. Switch 600 can include a next-hop logic block 630 that can facilitate next-hop tracking for switch 600. Next-hop logic block 630 can correspond to NHT system 150 of FIG. 1. Next-hop logic block 630 can include a tracking logic block 632, a programming logic block 634, a next-hop selection logic block 636, and a switchover logic block 638.

Tracking logic block 632 can facilitate tracking of next-hop switches of different provider networks. The tracking can be based on the topology information associated with switch 600 or the routing process of switch 600. Programming logic block 634 can generate an adjacency list for a respective prefix reachable via the provider networks based on the tracking. Programming logic block 634 can then program the adjacency list in the FDS of switch 600. Next-hop selection logic block 636, in conjunction with switch hardware 660, can identify the adjacency list applicable to a packet and select the next-hop switch from the adjacency list for forwarding the packet. If a route becomes unavailable, switchover logic block 638 can remove the next-hop switches impacted by the unavailability from corresponding adjacency lists.

One aspect of the present technology can provide a system for efficiently determining a set of next-hop switches from a switch. During operation, the system can determine the plurality of next-hop switches for an Internet Protocol (IP) address prefix. The system can then store, in an entry of a forwarding data structure of the switch, a list of identifying information indicating the plurality of next-hop switches corresponding to the IP address prefix. The identifying information for the plurality of next-hop switches can be stored in the list in an order of preference for forwarding traffic matching the IP address prefix. Upon receiving a packet with a destination IP address matching the IP address prefix, the system can select the entry from the forwarding data structure for determining a next-hop switch for forwarding the packet. The system can then determine the next-hop switch for the packet from the entry based on the order of preference.

In a variation on this aspect, the system can determine the plurality of next-hop switches by determining a plurality of loop-free routes for the IP address prefix from the switch and determining the plurality of next-hop switches from the plurality of loop-free routes. The plurality of loop-free routes can be determined using a routing protocol instance of the switch.

In a further variation, the system can store information associated with the plurality of loop-free routes in corresponding entries in a routing data structure of the switch in association with the IP prefix. The system can then generate the list by identifying the plurality of next-hop switches from the plurality of loop-free routes in the routing data structure.

In a variation on this aspect, the plurality of next-hop switches belongs to at least two service provider networks.

In a further variation, the system can determine the plurality of next-hop switches by obtaining topology information associated with the switch, identifying, from the topology information, switches coupled to the switch in the service provider networks, and tracking the identified switches as the plurality of next-hop switches In a variation on this aspect, the system can determine the order of preference based on a forwarding preference associated with the IP address prefix. The system can then order the identifying information in the list based on the order of preference.

In a further variation, the order of preference is based on one or more of: respective path costs associated with the plurality of next-hop switches, a preferred provider network, and preselection based on a user configuration.

In a variation on this aspect, the system can determine the next-hop switch by determining that an initial next-hop switch in the list is unavailable and selecting a subsequent next-hop switch in the list as the next-hop switch for the packet.

In a further variation, the system can remove the initial next-hop switch from the list.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    implementing a routing protocol on a network device in a network;
    determining, by the network device, routing information indicating a plurality of next-hop devices for an Internet Protocol (IP) address prefix based on the routing protocol;
    storing, in a routing data structure, the routing information associated with the IP address prefix;
    generating an adjacency list comprising identifying information of the plurality of next-hop devices in an order of preference based on the routing information in the routing data structure;
    generating, in a forwarding data structure separate from the routing data structure, an entry comprising the adjacency list and the IP address prefix;
    receiving a packet with a header comprising a destination IP address;
    looking up, using a longest-prefix match, the destination IP address of the packet in the forwarding data structure;
    in response to determining a match between the destination IP address and the IP address prefix based on the lookup, selecting the entry from the forwarding data structure for determining a next-hop device for forwarding the packet; and
    determining the next-hop device for the packet from the adjacency list in the entry based on the order of preference.

2. The method of claim 1, wherein determining the plurality of next-hop devices further comprises:
    determining, by the routing protocol, the routing information comprising a plurality of loop-free routes for the IP address prefix from the network device; and
    determining the plurality of next-hop devices from the routing information.

3. The method of claim 2, further comprising:
    storing the routing information in corresponding entries in the routing data structure in association with the IP prefix; and
    wherein generating the adjacency list comprises incorporating identifying information of the plurality of next-hop devices from the routing information in the routing data structure.

4. The method of claim 1, wherein corresponding subsets of the plurality of next-hop devices belong to at least two service provider networks.

5. The method of claim 4, wherein determining the plurality of next-hop devices for the IP address prefix further comprises:
    obtaining topology information associated with the network device;
    identifying, from the topology information, respective network devices coupled to the network device in the at least two service provider networks; and
    tracking the identified network devices in the at least two service provider networks as the plurality of next-hop devices.

6. The method of claim 1, further comprising:
    determining the order of preference based on a forwarding preference associated with the IP address prefix; and
    ordering the identifying information in the adjacency list based on the order of preference.

7. The method of claim 6, wherein the forwarding preference is based on one or more of:
    respective path costs associated with the plurality of next-hop devices;
    a preferred provider network; and
    preselection based on a user configuration.

8. The method of claim 1, wherein determining the next-hop device for the packet further comprises:
    subsequent to an initial next-hop device in the adjacency list being unavailable, selecting a subsequent next-hop device in the adjacency list as the next-hop device for the packet.

9. The method of claim 8, further comprising, in response to the initial next-hop device being unavailable, removing the initial next-hop device from the adjacency list.

10. A non-transitory computer-readable storage medium storing instructions that when executed by a computer cause the computer to perform a method, the method comprising:
    implementing a routing protocol on a network device in a network;
    determining, by the network device, routing information indicating a plurality of next-hop devices for an Internet Protocol (IP) address prefix based on the routing protocol;
    storing, in a routing data structure, the routing information associated with the IP address prefix;
    generating an adjacency list comprising identifying information of the plurality of next-hop devices in an order of preference based on the routing information in the routing data structure;
    generating, in a forwarding data structure separate from the routing data structure, an entry comprising the adjacency list and the IP address prefix;
    receiving a packet with a header comprising a destination IP address;
    looking up, using a longest-prefix match, the destination IP address in the forwarding data structure;
    in response to determining a match between the destination IP address and the IP address prefix based on the lookup, selecting the entry from the forwarding data structure for determining a next-hop device for forwarding the packet; and
    determining the next-hop device for the packet from the adjacency list in the entry based on the order of preference.

11. The non-transitory computer-readable storage medium of claim 10, wherein determining the plurality of next-hop devices further comprises:
    determining, by the routing protocol, the routing information comprising a plurality of loop-free routes for the IP address prefix from the network device; and
    determining the plurality of next-hop devices from the routing information.

12. The non-transitory computer-readable storage medium of claim 11, wherein the method further comprises:
    storing the routing information in corresponding entries in the routing data structure in association with the IP prefix; and
    wherein generating the adjacency list comprises incorporating identifying information of the plurality of next-hop devices from the routing information in the routing data structure.

13. The non-transitory computer-readable storage medium of claim 10, wherein corresponding subsets of the plurality of next-hop devices belong to at least two service provider networks.

14. The non-transitory computer-readable storage medium of claim 13, wherein determining the plurality of next-hop devices for the IP address prefix further comprises:
    obtaining topology information associated with the network device;
    identifying, from the topology information, respective network devices coupled to the network device in the at least two service provider networks; and
    tracking the identified network devices in the at least two service provider networks as the plurality of next-hop devices.

15. The non-transitory computer-readable storage medium of claim 10, wherein the method further comprises:
    determining the order of preference based on a forwarding preference associated with the IP address prefix; and
    ordering the identifying information in the adjacency list based on the order of preference.

16. The non-transitory computer-readable storage medium of claim 15, wherein the forwarding preference is based on one or more of:
    respective path costs associated with the plurality of next-hop devices;
    a preferred provider network; and
    preselection based on a user configuration.

17. The non-transitory computer-readable storage medium of claim 10, wherein determining the next-hop device for the packet further comprises:
    subsequent to an initial next-hop device in the adjacency list being unavailable, selecting a subsequent next-hop device in the adjacency list as the next-hop device for the packet.

18. The non-transitory computer-readable storage medium of claim 17, wherein the method further comprises, in response to the initial next-hop device being unavailable, removing the initial next-hop device from the adjacency list.

19. A computing system, comprising:
    at least one processing resource;
    forwarding hardware to store a forwarding data structure;
    at least one non-transitory computer-readable storage medium storing instructions executable by the at least one processing resource to:
    implementing a routing protocol operating in a network;
    determine routing information indicating a plurality of next-hop devices for an Internet Protocol (IP) address prefix based on the routing protocol;
    store, in a routing data structure of the computing system, the routing information associated with the IP address prefix;
    generate an adjacency list comprising identifying information of the plurality of next-hop devices in an order of preference based on the routing information in the routing data structure;
    store, in the forwarding data structure separate from the routing data structure, an entry comprising the adjacency list and IP address prefix;
    receive a packet with a header comprising a destination IP address;
    look up, using a longest-prefix match, the destination IP address of the packet in the forwarding data structure;
    in response to determining a match between the destination IP address and the IP address prefix based on the lookup, select the entry from the forwarding data structure for determining a next-hop device for forwarding the packet; and
    determine the next-hop device for the packet from the adjacency list in the entry based on the order of preference.

20. The computing system of claim 19, wherein the non-transitory computer-readable storage medium storing further instructions executable by the at least one processing resource to:
    subsequent to an initial next-hop device in the adjacency list being unavailable, select a subsequent next-hop device in the adjacency list as the next-hop device for the packet.

* * * * *